United States Patent
Hazel et al.

(10) Patent No.: US 7,666,528 B2
(45) Date of Patent: Feb. 23, 2010

(54) PROTECTION OF THERMAL BARRIER COATING BY A SACRIFICIAL COATING

(75) Inventors: Brian Thomas Hazel, West Chester, OH (US); Mark Gorman, West Chester, OH (US); Bangalore A. Nagaraj, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/317,032

(22) Filed: Dec. 17, 2008

(65) Prior Publication Data
US 2010/0008770 A1    Jan. 14, 2010

Related U.S. Application Data

(62) Division of application No. 11/001,884, filed on Dec. 1, 2004.

(51) Int. Cl.
*B32B 9/04* (2006.01)
*B32B 15/00* (2006.01)

(52) U.S. Cl. .............. 428/704; 428/688; 428/689; 428/697; 428/699; 428/702; 428/469; 428/908.8

(58) Field of Classification Search ........... 428/908.8, 428/920, 688, 689, 697, 699, 702, 457, 469, 428/471, 472, 472.2, 472.3
See application file for complete search history.

(56) References Cited

U.S. PATENT DOCUMENTS

| | | | |
|---|---|---|---|
| 4,055,705 A | 10/1977 | Stecura et al. | 428/633 |
| 4,328,285 A | 5/1982 | Siemers et al. | 428/633 |
| 4,832,987 A | 5/1989 | Ueda et al. | 427/297 |
| 4,975,330 A | 12/1990 | Mosser | 428/472.1 |
| 5,216,808 A | 6/1993 | Martus et al. | 29/889.1 |
| 5,236,745 A | 8/1993 | Gupta et al. | 427/454 |
| 5,260,099 A | 11/1993 | Haskell | 427/367 |
| 5,660,885 A | 8/1997 | Hasz et al. | 427/374.5 |
| 5,773,141 A | 6/1998 | Hasz et al. | 428/335 |
| 5,851,678 A | 12/1998 | Hasz et al. | 428/469 |
| 5,871,820 A | 2/1999 | Hasz et al. | 427/419.2 |
| 5,914,189 A | 6/1999 | Hasz et al. | 428/335 |
| 6,261,643 B1 | 7/2001 | Hasz et al. | 427/419.1 |
| 6,461,415 B1 | 10/2002 | Sambasivan et al. | 106/14.21 |
| 6,544,351 B2 | 4/2003 | Wang et al. | 148/22 |
| 6,562,409 B2 | 5/2003 | Koshkarian et al. | 427/376.2 |
| 6,627,323 B2 | 9/2003 | Williams et al. | 428/469 |
| 6,733,908 B1 | 5/2004 | Lee et al. | 428/702 |
| 2003/0035907 A1 | 2/2003 | Campbell et al. | 428/26 |
| 2004/0206267 A1 * | 10/2004 | Sambasivan et al. | 106/15.05 |

* cited by examiner

*Primary Examiner*—Gwendolyn Blackwell
(74) *Attorney, Agent, or Firm*—Marcella R. Louke; William Scott Andes

(57) ABSTRACT

According to an embodiment of the invention, an article of manufacture for use in a gas turbine engine is disclosed. The article comprises a part having a surface covered with a ceramic thermal barrier coating. The thermal barrier coating has an outer surface covered with a sacrificial phosphate coating, wherein the sacrificial phosphate coating reacts with contaminant compositions to prevent contaminant infiltration into the thermal barrier coating.

9 Claims, No Drawings

PROTECTION OF THERMAL BARRIER COATING BY A SACRIFICIAL COATING

CROSS REFERENCE TO RELATED APPLICATION

This application is a divisional application of Ser. No. 11/001,884 filed on Dec. 1, 2004, which is hereby incorporated by reference in its entirety.

FIELD OF THE INVENTION

The invention generally relates to a method for protecting thermal barrier coatings deposited on gas turbine and other heat engine parts from the deleterious effects of environmental contaminants. More particularly, the invention relates to a method of using a sacrificial coating, which reacts with the contaminant composition formed from the environmental contaminants, as well as articles coated with the sacrificial coating.

BACKGROUND OF THE INVENTION

Higher operating temperatures for gas turbine engines are continuously sought in order to increase efficiency. However, as operating temperatures increase, the high temperature durability of the components within the engine must correspondingly increase.

Significant advances in high temperature capabilities have been achieved through the formulation of nickel- and cobalt-based superalloys. For example, some gas turbine engine components may be made of high strength directionally solidified or single crystal nickel-based superalloys. These components are cast with specific external features to do useful work with the core engine flow and often contain internal cooling details and through-holes to provide external film cooling to reduce airfoil temperatures.

When exposed to the demanding conditions of gas turbine engine operation, particularly in the turbine section, the base alloy alone may be susceptible to damage, such as oxidation and corrosion attack, and may not retain adequate mechanical properties. Accordingly, the base alloys are often protected with various types of coating systems depending upon the engine part and operating environment.

Thermal barrier coatings are a key element in current and future gas turbine engine designs expected to operate at high temperatures, which produce high thermal barrier coating surface temperatures. One desired system for a hot high temperature engine part includes a strain-tolerant thermal barrier ceramic layer deposited onto a bond coating, which exhibits good corrosion resistance and closely matched thermal expansion coefficients.

Under service conditions, thermal barrier coated engine parts can also be susceptible to various modes of damage, including erosion, oxidation, and attack from environmental contaminants. At temperatures of engine operation, adherence of these environmental contaminants on the hot thermal barrier coated surface can cause damage to the thermal barrier coating. Environmental contaminants can form certain compositions, which may be liquid at the surface temperatures of thermal barrier coatings.

Chemical and mechanical interactions occur between the contaminant compositions and the thermal barrier coatings. Molten contaminant compositions can dissolve the thermal barrier coating or can infiltrate its pores and openings, initiating and propagating cracks causing delamination and loss of thermal barrier coating material.

Some environmental contaminant compositions that deposit on thermal barrier coating surfaces contain oxides mainly of calcium, magnesium, aluminum, silicon, and mixtures thereof with possible minor additions of titanium, iron, nickel, chromium and mixtures thereof. These oxides combine to form contaminant compositions comprising calcium-magnesium-aluminum-silicon-oxide systems ($CaO$—$MgO$—$AlO$—$SiO_2$), herein referred to as CMAS. Damage to thermal barrier coatings occurs when the molten CMAS infiltrates the thermal barrier coating. After infiltration and upon cooling, the molten CMAS, or other molten contaminant composition, solidifies. The stress build up in the thermal barrier coating may cause cracking and/or spallation of the coating material and loss of the thermal protection that it provides to the underlying part. Alternately of in addition, the CMAS can react chemically with the TBC to accelerate thermal sintering or dissolve stabilizing components such as $Y_2O_3$ resulting in damage to the TBC coating.

U.S. Pat. No. 5,660,885 discloses sacrificial oxide protective coatings. In particular, this patent discloses sacrificial oxide protective coatings of alumina, magnesia, chromia, calcia, scandia, calcium zirconate, silica, spinels such as magnesium aluminum oxide, and mixtures thereof. While the above coatings, particularly alumina, are advantageous they are often costly to manufacture and deposit. For example, techniques such as CVD and PVD processing are often employed to deposit the oxides. Moreover, lower cost processing may be required to make multi-layered coating (e.g. bond coat, thermal barrier coating and CMAS mitigation) cost effective. Thus, there is a continuing need to reduce or prevent damage to thermal barrier coatings caused by the reaction or infiltration of molten contaminant compositions at the operating temperature of the engine. Embodiments of the invention fulfill this need and others.

BRIEF DESCRIPTION OF THE INVENTION

In accordance with embodiments of the invention, we have advantageously determined that a sacrificial phosphate coating, such as an aluminum phosphate coating, may be formed by techniques including air spraying, brushing and "dip and dry" methods that when reacted with the CMAS at high temperature will raise the melting temperature and viscosity of the CMAS material so that the contaminant composition does not form a reactive liquid or infiltrate into the thermal barrier coating. Due to the use of techniques that preferably deposit the coating in a liquid form followed by drying, instead of PVD or CVD processing, the cost of depositing this sacrificial coating is also significantly reduced.

Accordingly, in one embodiment of the invention, a method for protecting a thermal barrier coating on a superalloy part when contaminant compositions are present that adhere on a surface of a thermal barrier coated part is disclosed. The method comprises depositing a sacrificial phosphate coating on the thermal barrier coating. The sacrificial phosphate coating is deposited in an effective amount, using a liquid deposition technique, so that this coating reacts chemically and is consumed by the contaminant composition at an operating temperature of the thermal barrier coating by raising the melting temperature or viscosity of the contaminant composition when the contaminant composition is present on the surface of the thermal barrier coated part. Thus, infiltration of the contamination composition into the thermal barrier coating or chemical reaction with the TBC is reduced or eliminated.

In accordance with another embodiment of the invention, an article of manufacture for use in a gas turbine engine is disclosed. The article of manufacture comprises a part having a surface covered with a ceramic thermal barrier coating. The thermal barrier coating has an outer surface covered with a sacrificial phosphate coating, wherein the sacrificial phosphate coating reacts with contaminant compositions to prevent reactions with the TBC or contaminant infiltration into the thermal barrier coating.

Other features and advantages will be apparent from the following more detailed description, which illustrates by way of example the principles of the invention.

DETAILED DESCRIPTION OF THE INVENTION

In accordance with embodiments of the invention, it has been determined that by applying a sacrificial phosphate coating that reacts with environmental contaminants and resulting contaminant compositions encountered on surfaces of thermal barrier coated parts during service operation, the melting temperature or viscosity of the contaminant composition can be increased. Thus, the contaminant composition does not become molten and infiltration or viscous flow of the mixture into the thermal barrier is curtailed. In addition, the CMAS does not react chemically with the TBC to accelerate thermal sintering or dissolve stabilizing components such as $Y_2O_3$ resulting in damage to the TBC coating. This reduces damage to the thermal barrier coating.

Increasing the melting temperature and viscosity of the contaminant composition reduces infiltration into the thermal barrier coating. As a result of the sacrificial coating being consumed or dissolved into the contaminant composition, the composition does not become liquid or has an increased viscosity at the operating temperature of the thermal barrier coating. Infiltration or viscous flow of the contaminant composition into thermal barrier coating cracks, openings, and pores is diminished.

Embodiments of the invention also protect the ceramic thermal barrier coating from dissolution or spallation due to chemical and mechanical attack by the contaminant composition. This enhances the life of the thermal barrier coated part and reduces part failure.

Sources of environmental contaminants include, but are not limited to, sand, dirt, volcanic ash, fly ash, cement, runway dirt, fuel and air sources, oxidation and wear products from engine components, and the like. The environmental contaminants adhere to the surfaces of the thermal barrier coated parts. At the operating temperatures of the thermal barrier coating, the environmental contaminants then form contaminant compositions on surfaces of the thermal barrier coating, which may have melting ranges or temperatures at or below the component surface operating temperature.

Additionally, environmental contaminants may include magnesium, calcium, aluminum, silicon, chromium, iron, nickel, barium, titanium, alkali metals, and compounds thereof. The environmental contaminants may be oxides, carbonates, salts and mixtures thereof.

The chemical composition of the contaminant composition typically corresponds to the composition of the environmental contaminants from which it is formed. For instance, at operational temperatures of about 1000° C. (1832° F.) or more, the contaminant composition typically corresponds to compositions in the calcium-magnesium-aluminum-silicon oxide systems or CMAS. Generally, the environmental contaminant compositions known as CMAS comprise primarily a mixture of magnesium oxide, calcium oxide, aluminum oxide and silicon oxide. Other elements, such as nickel, iron, titanium and chromium, may be present in the CMAS in minor amounts, e.g. less than about 10 weight percent of total amount of contaminant composition present, when these elements or their compounds are present in the environmental contaminants. CMAS may take the form of about 29 wt % calcium oxide, 7 wt % magnesium oxide, 11 wt % aluminum oxide, 43 wt % silicon oxide, 2 wt % nickel oxide, 8 wt % iron oxide and small amounts of titanium oxide and chromium oxide may be present up to about 10 wt % each which corresponds to a CMAS melting point of about 1227° C. (2240° C.). The contaminant may also have a melting point of less than about 1315° C. (2399° F.).

In accordance with embodiments of the invention, the protective coatings herein disclosed may be described as sacrificial or reactive in that they protect thermal barrier coatings by undergoing chemical or physical changes when in contact with a damaging contaminant composition. Thus, the character of the protective coating is sacrificed. The result of this change is to increase either the viscosity or physical state of the contaminant composition, e.g. liquid CMAS, by dissolving in the composition or reacting with it, to form a by-product material which is not liquid or at least more viscous than the original CMAS.

We have found that a sacrificial or reactive phosphate coating deposited on the outer surface of a thermal barrier coating reacts with the contaminant composition at the surface temperature of the thermal barrier coating. The reaction may be a chemical reaction in which the sacrificial coating is consumed, at least partially, and elevates the melting temperature or viscosity of the contaminant composition. The melting temperature of the contaminant composition is preferably increased at least to the surface temperature of the thermal barrier coating in the reaction zone between the CMAS and the sacrificial coating material. This rise in melting point will make the CMAS material sufficiently viscous that infiltration into or reaction with the thermal barrier coating is unlikely or limited to the immediate surface avoiding cracking and/or spallation of the coating material and loss of the thermal protection it provides to the underlying substrate. Enough sacrificial material will be available to be capable of increasing the melting temperature by at least about 10° C. (18° F.), more preferably by about 40-100° C. (72-180° F.), above the surface temperature of the thermal barrier coating during its operation. Thus, as an illustration of embodiments of the invention, if the surface temperature of the thermal barrier coating during operation is about 1230° C. (2246° F.), then it is preferred to increase the melting temperature of the CMAS composition to at least 1240° C. (2264° F.).

The composition of the sacrificial phosphate coatings described herein may include any suitable phosphate coating, with aluminum phosphate being particularly advantageous. For example, the sacrificial phosphate coating may be selected from the group consisting of aluminum phosphate, magnesium phosphate, calcium phosphate and combinations thereof.

The sacrificial phosphate coatings of the invention are preferably applied to a thermal barrier coating in an amount sufficient to effectively elevate the melting temperature or viscosity of substantially all of the liquid contaminant formed. Thus, as little as about 1 micron of thickness of this coating on the surface of the thermal barrier coating may help prevent infiltration of molten contaminant compositions into the thermal barrier coating. Preferably, about 1 micron to 75 microns thickness of this coating is deposited on the surface of the thermal barrier coating and, more preferably about 3 microns to 25 microns of thickness of this coating is deposited on the surface of the thermal barrier coating.

Advantageously, the sacrificial phosphate coatings of the invention are preferably deposited by air spraying, brushing, "dip and dry" techniques or other suitable application methods. Liquid application methods significantly reduce the cost of application in comparison other deposition methods, including vapor deposition techniques of CVD and PVD. Such liquid application methods followed by curing result in effective sacrificial phosphate coatings, which protect the TBC from spallation and other contaminant damage.

The following sets forth examples of suitable deposition techniques for the sacrificial phosphate coatings described herein. These descriptions are meant to be merely illustrative and thus non-limiting. Precursors that are liquid at room temperature may preferably be employed in the coating deposition process. For example, a mixture of hydrated aluminum dissolved in phosphoric acid may be air sprayed onto a desired substrate or the desired substrate may be dipped into the mixture. The liquid properties can be approximately 9.5 pounds per gallon with a viscosity of approximately 17 seconds on a #2 Zahn cup at 25° C. (77° F.). Optionally, the coating thickness can be increased incrementally by repeating the application cycle until the desired thickness is achieved. Suitable substrates include, but are not limited to, TBC coated nickel-, cobalt- and iron-based superalloys alone or in combination and in cast form such as provided by directionally solidified or single crystal casting processes, with or without a bond coat between the TBC and base metal substrate. Upon deposition onto the TBC, the deposited coating typically has a tacky texture and may thus be dried by any suitable method. Preferably, the deposited coating is dried at elevated temperatures by baking in an oven or other suitable drying device. Temperatures of about 343° C. (650° F.) at a curing time of about 30 minutes and greater are preferred, but any time at temperature that drives off the water portion of the liquid precursor is sufficient. The time for curing will vary depending upon factors such as curing temperature and size of the part, as one skilled in the art would recognize.

Another suitable deposition technique for the sacrificial phosphate coatings is to use a metal dihydrogen phosphate in a "dip and dry" process. Alfa Aesar's aluminum dihydrogen phosphate, 50% w/w aqueous solution (Alfa Aesar stock number 42858) is an example. The substrate is submersed in the metal dihydrogen phosphate solution to coat the desired surfaces. The metal dihydrogen phosphate is then dried by an elevated temperature bake. A bake temperature of about 538-982° C. (1000-1800° F.) for approximately 30 minutes is preferred, but any time and temperature that drives off the water of the liquid precursor is acceptable. Optionally, during the dipping cycle, a vacuum can be utilized to pull the air from the TBC pores and openings allowing partial infiltration of the dihydrogen phosphate (or phosphate precursor). In contrary, an elevated pressure atmosphere, such as about 100 psi, can be used to force the metal dihydrogen phosphate (or phosphate precursor) into the TBC pores and openings. This will increase the volume of sacrificial phosphate coating present to react with the CMAS without increasing the coating surface thickness that makes it susceptible to hard particle erosion or spallation due to the CTE mismatch during thermal cycling. Optionally, the coating thickness can be increased incrementally by repeating the "dip and dry" cycle until the desired thickness is achieved.

The thickness of the sacrificial phosphate coatings may be of any suitable thickness to facilitate the afore-described reaction conditions with the contaminant compositions. For example, the thickness may typically vary between about 1 micron (0.04 mil) to about 75 microns (3 mil). Preferably, the thickness is between about 3 micron (0.12 mil) to about 25 microns (1 mil). We have determined that these thinner coatings, including coatings of about 12.5 microns (0.5 mils) and less, are particularly advantageous with respect to their spallation resistance.

Typically, the sacrificial phosphate coatings described herein will be applied over a TBC coated conventional bond coat(s), which has been applied to an underlying base metal component, such as a turbine blade. Any conventional bond coat may be employed, including but not limited to diffusion aluminide bond coats, modified diffusion aluminides such as platinum aluminide, MCrAlY coatings, to name a few. For purposes of the present invention, however, it is not necessary to employ a bond coat.

Accordingly, in a preferred embodiment of the invention, a thermal barrier coating is applied over the afore-described bond coat or directly onto the base metal substrate depending upon the desired application. The thermal barrier coatings herein described may also be any suitable thermal barrier coatings. For example, the thermal barrier coatings may be a chemically stabilized zirconia selected from the group consisting of yttria-stabilized zirconia, scandia-stabilized zirconia, calcia-stabilized zirconia, magnesia-stabilized zirconia, and combinations thereof. A further example of a suitable ceramic thermal barrier coating is about 8 weight percent yttria-about 92 weight percent zirconia. Suitable ceramic thermal barrier coatings may be applied to the base metal or bond coat using any method including, but not limited to, electron beam physical vapor deposition (EB-PVD) and air plasma spray (APS).

EXAMPLES

Embodiments of the invention will be described by way of examples, which are meant to be merely illustrative and therefore non-limiting.

Example 1

Aluminum phosphate coatings of about 0.5 mil (12.5 microns) in thickness may be deposited by air spraying. For example, a mixture of hydrated aluminum dissolved in phosphoric acid may be air sprayed onto a desired substrate. The liquid properties of the spray precursor can be approximately 9.5 pounds per gallon with a viscosity of approximately 17 seconds on a #2 Zahn cup at 25° C. (77° F.). The sprayed coating is then cured at about 343° C. (650° F.) for about 30 minutes. The coating thickness can be tailored by repeating the spray cycle until the desired thickness is achieved.

Example 2

Aluminum phosphate coatings of about 5 to 10 microns in thickness may be deposited by dipping the substrate in aluminum dihydrogen phosphate at room temperature. Alfa Aesar's aluminum dihydrogen phosphate, 50% w/w aqueous solution (Alfa Aesar stock number 42858) is an example. The aluminum dihydrogen phosphate may then be dried at room temperature for about 1 hour and cured in air at about 760° C. (1400° F.) for about 30 minutes. Each "dip and dry" cycle forms an aluminum phosphate coating thickness of about 2 microns. The coating thickness can be tailored by repeating the "dip and dry" cycle until the desired thickness is achieved.

While various embodiments are described herein it will be appreciated from the specification that various combinations of elements, variations or improvements therein may be made by those skilled in the art, and are within the scope of the invention.

What is claimed is:

1. An article of manufacture for use in a gas turbine engine comprising:

a part comprising a superalloy substrate having a surface covered with a ceramic thermal barrier coating;

a sacrificial phosphate coating overlying the ceramic thermal barrier coating, wherein the sacrificial phosphate coating is selected from the group consisting of magnesium phosphate, calcium phosphate and mixtures thereof, wherein the sacrificial coating is present in an effective amount to react chemically with a calcium-magnesium-aluminum-silicon-oxide (CMAS) contaminant composition at an operating temperature of the thermal barrier coating to form a by-product material having a higher melting temperature or viscosity than the CMAS contaminant composition.

2. The article of claim 1, wherein the part is a turbine blade, vane or shroud.

3. The article of claim 1, wherein the superalloy substrate is selected from the group consisting of nickel-based alloys, cobalt-based alloys, iron-based alloys, and mixtures thereof.

4. The article of claim 1, wherein the effective amount of the sacrificial phosphate coating is about 1 micron to 75 microns in thickness.

5. The article of claim 1, wherein the thermal barrier coating is located over a bond coat, which has been applied to the superalloy substrate.

6. The article of claim 1, wherein the thermal barrier coating is a cured coating, which was initially deposited in liquid form prior to curing.

7. The article according to claim 1 wherein the by-product material has a melting temperature of at least 10° C. greater than the operating temperature of the thermal barrier coating.

8. The article of claim 1, wherein the thermal barrier coating is a stabilized zirconia selected from the group consisting of yttria-stabilized zirconia, scandia-stabilized zirconia, calcia-stabilized zirconia, magnesia-stabilized zirconia, and/or zirconia stabilized with one or more rare earth oxides and combinations thereof.

9. The article of claim 8, wherein the thermal barrier coating is about 8 weight percent yttria and about 92 weight percent zirconia.

* * * * *